United States Patent [19]
Heisman et al.

[11] Patent Number: 5,499,495
[45] Date of Patent: Mar. 19, 1996

[54] LAWN MOWER HAVING ADJUSTABLE AIR VENTS

[75] Inventors: Richard A. Heisman, Jackson; Keith Mosley, Alamo; Stephen J. Vos, Jackson, all of Tenn.

[73] Assignee: Murray, Inc., Brentwood, Tenn.

[21] Appl. No.: 365,305

[22] Filed: Dec. 28, 1994

Related U.S. Application Data

[63] Continuation of Ser. No. 190,548, Feb. 1, 1994, abandoned.
[51] Int. Cl.$^6$ .......................... A01D 34/64; A01D 34/66; A01D 34/68
[52] U.S. Cl. .................................. 56/320.1; 56/17.5
[58] Field of Search ..................... 56/12.8, 17.5, 56/320.1, 320.2, 10.5, 13.5, 13.6, DIG. 8

[56] References Cited

U.S. PATENT DOCUMENTS

| | | | |
|---|---|---|---|
| 3,028,717 | 4/1962 | West ............................... | 56/10.5 |
| 3,144,258 | 8/1964 | Ottosen et al. ................... | 280/47.37 |
| 3,710,276 | 2/1965 | Hall ................................. | 56/12.8 |
| 3,795,095 | 3/1974 | Erickson et al. ................. | 56/320.2 |
| 3,817,547 | 6/1974 | Erickson ......................... | 280/47.37 |
| 3,818,686 | 6/1974 | Haffner et al. .................. | 56/11.1 |
| 4,205,510 | 6/1980 | Raniero .......................... | 56/12.9 |
| 4,245,456 | 1/1981 | Zippel ............................. | 56/12.8 |
| 4,690,125 | 9/1987 | Beller ............................. | 126/25 A |
| 4,803,931 | 2/1989 | Carson ........................... | 110/163 |
| 5,103,869 | 4/1992 | Kimura et al. .................. | 137/625.28 |

*Primary Examiner*—Stephen J. Novosad
*Attorney, Agent, or Firm*—Cushman Darby & Cushman

[57] ABSTRACT

Adjustable ventilation apparatus for a lawn mower, adapted to allow adjustment of the airflow rate into the cutting deck to maximize operation of the lawn mower under various operating conditions. In one embodiment, the apparatus comprises a ring disposed intermediate the engine and cutting deck of a walk behind mower, having a plurality of radial openings formed therethrough. An annular cover is provided encircling the ring, with the cover having a like number of openings formed in the peripheral wall thereof. Rotational movement of the cover relative to the ring moves the openings therein into and out of alignment with the openings in the ring, thereby defining open and closed positions for the vent, respectively. The cover may also be moved to a plurality of positions intermediate fully open and fully closed to provide the appropriate airflow into the cutting deck. An alternative embodiment provides a stationary outer cover and a rotatable ring, each having a plurality of longitudinal slots and radial openings formed therein. Selective positioning of the ring relative to the cover determines the opening size formed through the slots and the consequential airflow through the top of the cutting deck. The ring includes a handle extending therefrom for moving and positioning the ring, the handle having a wire stop attached thereto engageable in a serrated portion of the stationary cover to retain the ring in its desired position and prevent inadvertent movement thereof. A third embodiment is specially adapted for use on riding mowers having a pair of cutting blades, comprising two stationary portions fixed to the cutting deck and two corresponding outer rotatable rings interconnected for synchronized movement.

19 Claims, 6 Drawing Sheets

LAWN MOWER HAVING ADJUSTABLE AIR VENTS

REFERENCE TO APPLICATION

This is a continuation of application Ser. No. 08/190,548 filed Feb. 1, 1994, now abandoned.

BACKGROUND OF THE INVENTION

1. Field

This invention relates to lawn mowers, and, more particularly, to lawn mowers having adjustable air vents for improved circulation within the cutting deck.

2. Description of the Prior Art

Lawn mowers, comprising a cutting deck having one or more blades disposed therein and an engine operatively connected to the blades, have been used for many years in the practice of lawn maintenance. Traditionally, both walk behind and riding mowers employ one or more rotating blades to cut the grass and discharge the clippings through a chute in the cutting deck, either outwardly onto the lawn or into a bag or similar receptacle for collection and subsequent disposal. It is well know that a certain degree of airflow through the cutting deck is essential for the effective discharge of grass clippings.

In more recent years, ecological advocates have discouraged the practice of disposing of grass clippings in landfills and the use of chemical fertilizers, and have encouraged the use of mulching mowers which return the pulverized grass clippings onto the ground to be used as natural organic fertilizer. It has become recognized that airflow within the cutting deck significantly affects the performance of a mulching mower. It has also been recognized that the airflow requirements for optimal mulching are different from the airflow requirement for discharging and/or bagging the clippings.

Initially, lawn mowers were designed to be used exclusively for either mulching or discharging grass clippings. It has recently been discovered that, by utilizing specially configured blades and cutting decks, a single mower may be adapted to either mulch or discharge, and to perform either function acceptably well. Numerous improvements have been made in the design of blades, cutting decks, and plugs for sealing the discharge chute, all of which have improved both the mulching and discharging characteristics of various lawn mowers. The varying airflow requirements for such multi-purpose lawn mowers have largely been ignored in the prior art.

It has also been observed that the height and moisture content of grass being cut significantly affect the airflow requirements, regardless of whether the grass clippings are to be discharged or mulched. Heretofore, little attention has been paid to the airflow needs through a cutting deck which vary considerably depending upon the condition of the grass and the disposition of the clippings.

BRIEF SUMMARY OF THE INVENTION

A primary object of this invention is to provide a lawn mower having adjustable air vents in the cutting deck.

Another object is to provide adjustable air vents which are easily accessible to the user of a lawn mower incorporating such air vents.

A still further object is to provide, air vents for use on a lawn mower cutting deck which are adjustable through a plurality of different settings.

In order to achieve these and other objects, the present invention is an adjustable vent comprising a ring securable to the top of a cutting deck, and an annular cover having a generally cylindrical outer wall slidably disposed about the ring. The ring and the outer wall of the cover both include a plurality of radial slots formed therethrough. The outer cover is selectively movable between open and closed positions, corresponding to the slots in the cover and ring being aligned or misaligned, respectively. The open position allows maximum airflow through the vent into the interior of the cutting deck, while the closed position allows substantially no airflow through the vent. The outer cover may also be set at a plurality of positions intermediate fully open and fully closed, so that the airflow into the cutting deck may be adjusted as desired according to the operating conditions. In the first embodiment, the ring is a spacer disposed between the engine and cutting deck of a walk behind mower.

A second embodiment of the vent apparatus comprises a stationary outer cover and an inner ring rotatably movable relative thereto. A plurality of radial slots and lateral openings in both the ring and cover are selectively alignable in a plurality of positions to provide a variety of airflow conditions. A handle extends from the rotatable inner member to facilitate movement thereof, and includes a wire stop engageable with a plurality of notches formed in the cover to prevent inadvertent movement of the inner member. The above and other objects will become apparent to those skilled in the art upon reading the following detailed description in conjunction with the appended drawings.

DETAILED DESCRIPTION OF THE PREFERRED EMBODIMENT

Figure 1:
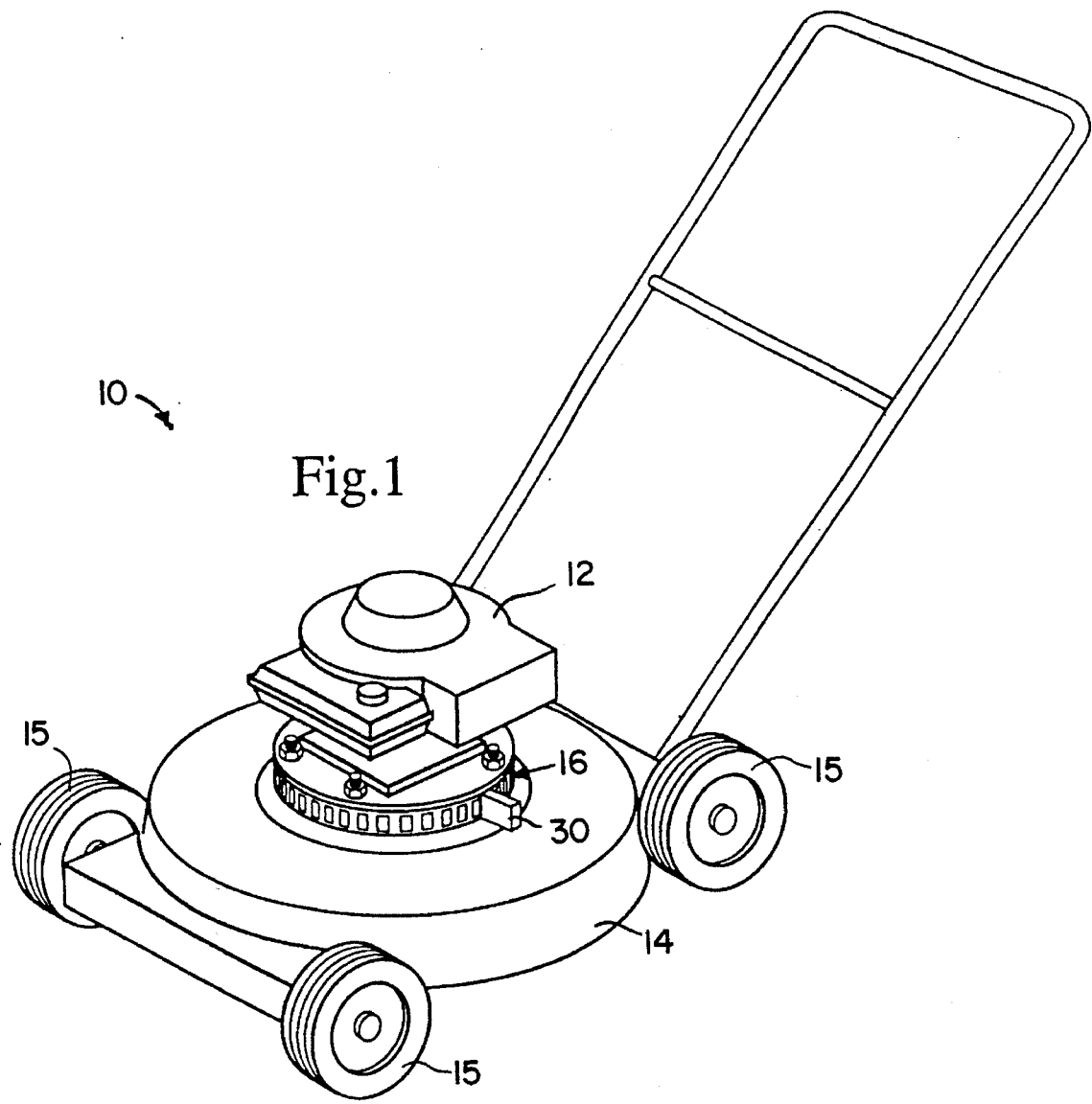
FIG. 1 is a top perspective view of a walk behind lawn mower incorporating the adjustable air vent of the present invention.

In FIG. 1, a typical walk behind lawn mower 10 is shown having an internal combustion engine 12 operatively secured to the top of a cutting deck 14, supported at a desired cutting height by four wheels 15. As those skilled in the art will readily understand, a cutting blade is disposed within cutting deck 14, operatively connected to engine 12. It is also to be understood that the preferred embodiment of lawn mower 10 comprises a mower adapted for either discharging or mulching the grass clippings, although the advantages provided by this invention will apply, in varying degrees, to virtually all lawn mowers, including riding mowers.

Figure 2:
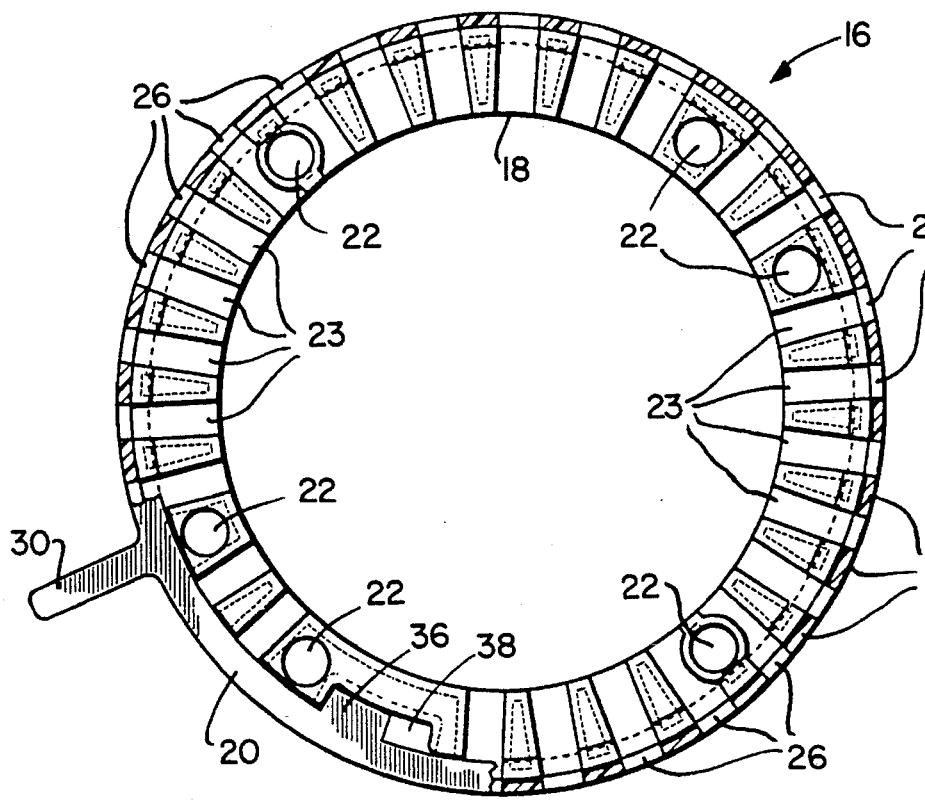
FIG. 2 is a top plan view, partially in section, showing the adjustable vent mechanism in its fully open position.
Figure 3:
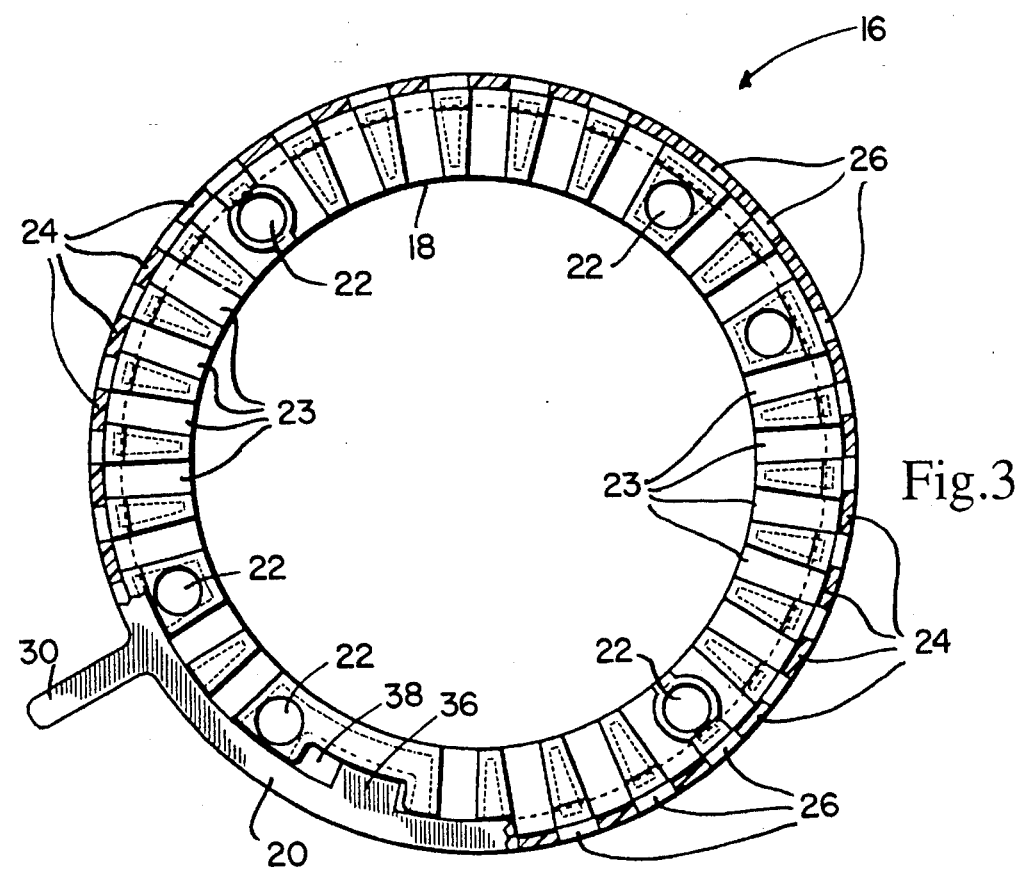
FIG. 3 is a top view similar to FIG. 2, showing the vent mechanism in its fully closed position.

The unique advantages provided by this invention are the result of the novel adjustable vent, the first embodiment being identified generally by reference numeral 16 in FIG. 1. Vent 16 is configured to fit between engine 12 and cutting deck 14. As best illustrated in FIG. 2 and 3, vent 16 comprises two components, a stationary ring 18 and an outer cover 20 slidably disposed concentrically about ring 18. Ring 18 includes a plurality of holes 22 formed therethrough which serve as mounting holes for receiving the bolts typically used to secure engine 12 to cutting deck 14. Accordingly, it will be understood that ring 18 serves as a spacer separating engine 12 from cutting deck 14, so that the thickness and configuration of ring 18 must be suitable for supporting engine 12. In this regard, it is expected that ring 18 and cover 20 be formed of a suitably strong plastic or metallic material. When formed from plastic such as polyethylene, as preferred, each hole 22 includes a cylindrical metal sleeve (not shown) inserted therein to support engine 12, such sleeve being slightly taller than ring 18 so that the weight of engine 12 and the compressive force created by the mounting bolts are borne by the sleeves, rather than ring 18.

Figure 4:
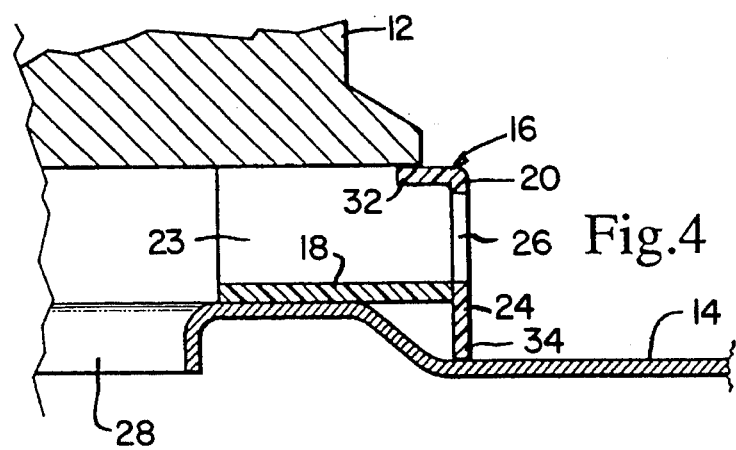
FIG. 4 is an enlarged sectional view through a portion of the vent mechanism as installed on a lawn mower.

Ring 18 includes a plurality of radially formed openings 24 formed therethrough. Similarly, the outer cylindrical wall 24 includes an equal number of openings 26 formed therethrough. As shown in FIGS. 2 and 4, cover 20 may be selectively positioned so that openings 23 and 26 are substantially in complete alignment, thereby maximizing airflow into cutting deck 14 through central opening 28. This position will be understood as comprising the fully open condition of the vent 16. Alternatively, the vent 16 may be moved to a closed position as shown in FIG. 3 by rotating cover 20 relative to ring 18 so that openings 23 are substantially blocked by wall 24. It will be appreciated that cover 20 may also be placed in a variety of positions intermediate the fully open and fully closed positions shown in FIGS. 2 and 3, so that the airflow rate may be adjusted as necessary in order to maximize performance of mower 10.

Cover 20 preferably includes a radially extending handle 30 which may be grasped by the user to facilitate adjustment of cover 20. Upper rim 32 of cover 20 is integrally formed with peripheral wall 24, and is configured to reside within a similarly dimensioned recess formed in the upper annular edge portion of ring 18. (The recess in ring 18 is shown in broken lines in FIGS. 2 and 3). Peripheral wall 24 is preferably taller than ring 18, with lower edge 34 extending below the lower surface of ring 18 as shown in FIG. 4. When configured as shown herein, cover 20 forms an effective and easily adjustable mechanism for varying the airflow rate through openings 23, and provides an attractive outward appearance for vent 16. Upper rim 32 also includes a tab 36 integrally formed therein, disposed within recess 38 formed in the top surface of ring 18. In the first embodiment shown, recess 38 serves to limit the movement of tab 36, thereby defining the fully open and closed positions of vent 16.

FIGS. 5–8 illustrate an alternative embodiment of the adjustable air vent of this invention, identified generally by reference numeral 40. Vent apparatus 40 comprises a stationary outer cover 42 and a rotatable inner ring 44 enclosed thereby. Preferably, cover 42 includes a central annular lip 46 adapted to snap into central opening 48 formed in ring 44, thereby securing the components together substantially as a unit while allowing rotational movement of ring 44 relative to cover 42. Inner ring 44 includes a plurality of radial slots 50 formed in the base portion 51 and lateral openings 52 formed in annular wall 53. Cover 42 includes a plurality of similar slots 54 formed in base portion 55 and openings 56 formed in annular wall 57, which are selectively alignable with slots 50 and openings 52 in ring 44, respectively. The alignment of slots 50 and 54, which may be selectively adjustable by the user of apparatus 40, controls the flow of air through central opening 28 into the interior cutting chamber of deck 14.

The relative position of openings 52 and 56 is readily visible to the user of apparatus 40, thereby providing visual indication of the corresponding relative position of slots 50 and 54 and the consequential airflow through apparatus 40. It is expected that a portion of the air passing through slots 50 and 54 will naturally pass through openings 52 and 56. A significant portion of the air, however, may instead pass through the spaces between engine 12 and cover 42.

Figure 5:
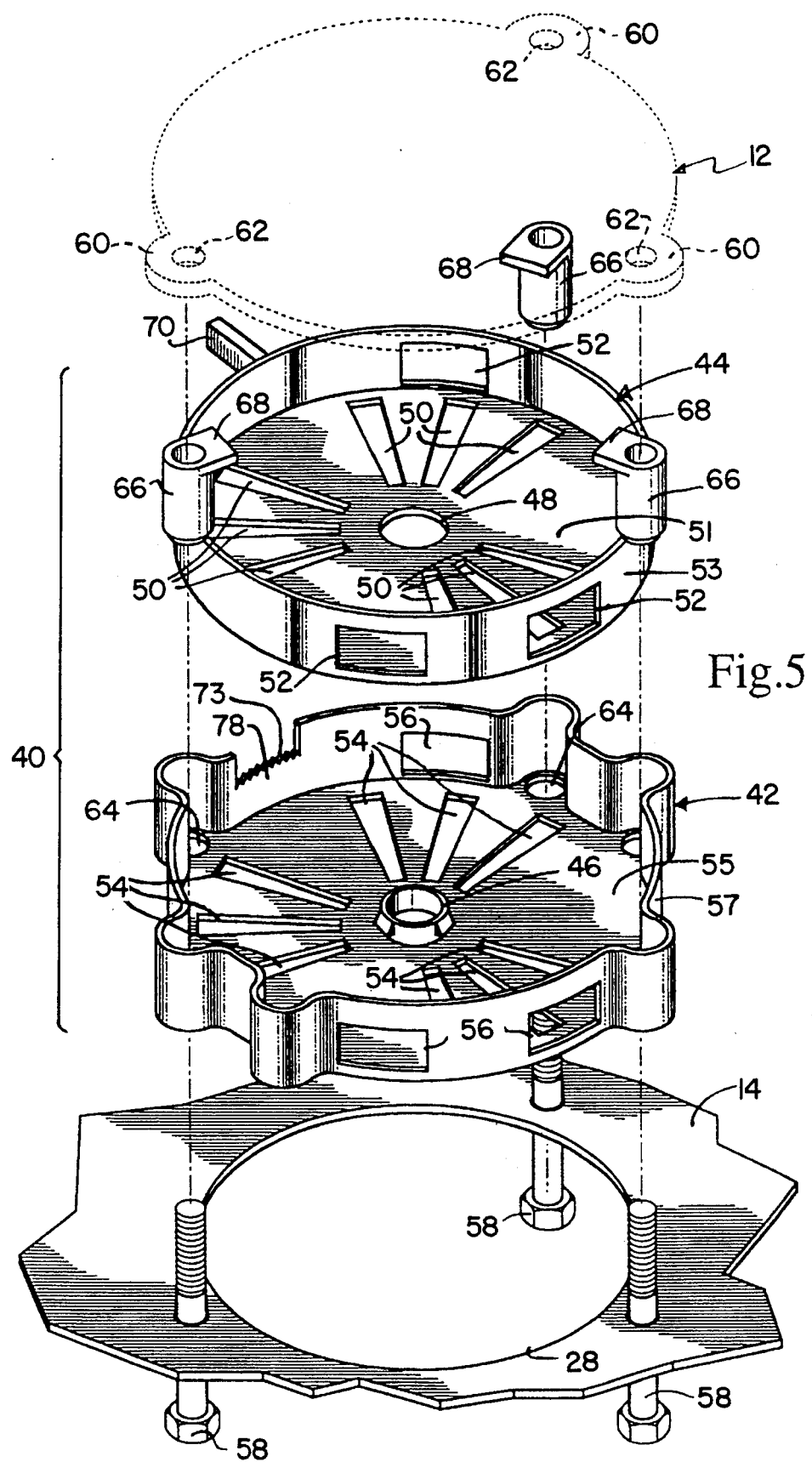
FIG. 5 is an exploded isometric view of an alternative embodiment of the present invention, showing primarily the top and side portions thereof.
Figure 8:
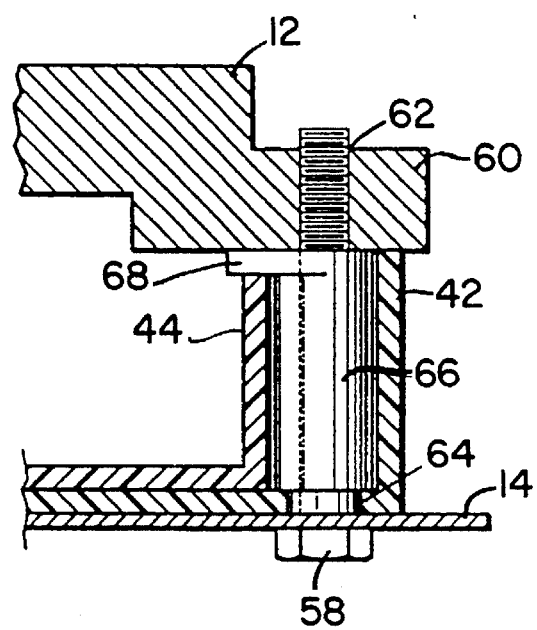
FIG. 8 is a side sectional view through a representative mounting hole of the alternative embodiment.

As shown in FIG. 5, vent apparatus 40 is preferably secured intermediate cutting deck 14 and engine 12 by means of a plurality of bolts 58 inserted from the underside of cutting deck 14. Engine 12, shown generally in phantom in FIG. 5, preferably includes bosses 60 formed thereon for receiving bolts 58. Typically, the base portion of engine 12 which includes bosses 60 will comprise a casting having holes 62 formed therein, and bolts 58 will be of a self-tapping variety which form internal threads within holes 62 upon assembly. As shown in FIG. 8, bolts 58 extend through holes 64 formed in cover 42, with spacers 66 being included to bear the weight of engine 12.

As with the first embodiment discussed above, cover 42 and ring 44 are preferably injection molded from a suitable plastic, such as polyethylene, and are therefore unsuitable for supporting engine 12. Accordingly, spacers 66 are included to avoid undue stress on either cover 42 or ring 44. Each spacer 66 further includes an upper shoulder 68 which, when assembled as shown in FIG. 8, is disposed intermediate the lower surface of boss 60 and the upper edge of ring 44, thereby reducing pressure on ring 44 and allowing the free rotational movement thereof.

Figure 6:
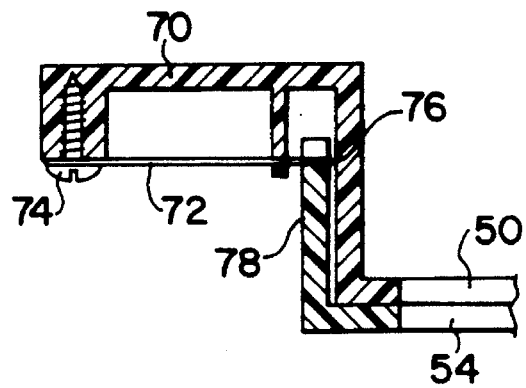
FIG. 6 is a side sectional view through the handle of the alternative embodiment as shown in FIG. 5, on an enlarged scale.
Figure 7:
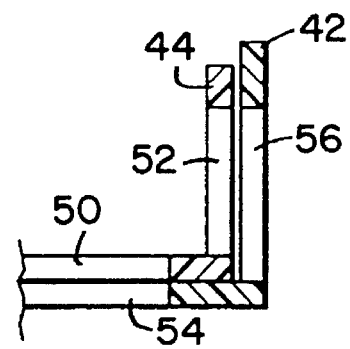
FIG. 7 is a side sectional view through a representative vent opening of the alternative embodiment.

Inner ring 44 is selectively movable between a plurality of positions, each of which provides a different degree of airflow through slots 50 and 54. At the extreme fully open position, slots 50 and 54 are perfectly aligned for maximum airflow; at the other extreme, slots 50 and 54 are completely unaligned so that the base portion 51 of ring 44 effectively seals slots 54 for minimized airflow, resulting in a closed condition for apparatus 40. Ring 44 includes a handle 70 extending therefrom, which is intended to be grasped by the user for facilitating movement of ring 44. As shown in FIG. 6, handle 70 preferably includes a wire stop 72 secured thereto by means of screw 74. The distal end 76 of wire stop 72 engages one of a plurality of notches 73 formed in serrated portion 78 of cover 42, thereby retaining ring 44 in its desired position. The engagement of wire stop 72 and notches 73 prevents inadvertent movement of ring 44 relative to cover 42 which would otherwise result from vibration during normal operation of mower 10. As will be evident from FIG. 5, the extreme left and right positions of handle 70 in the vicinity of serrated position 78 establish the fully open and closed conditions for apparatus 40, while the plurality of intermediate positions defined by notches 73 provide variably adjustable airflow through apparatus 40.

Figure 9:
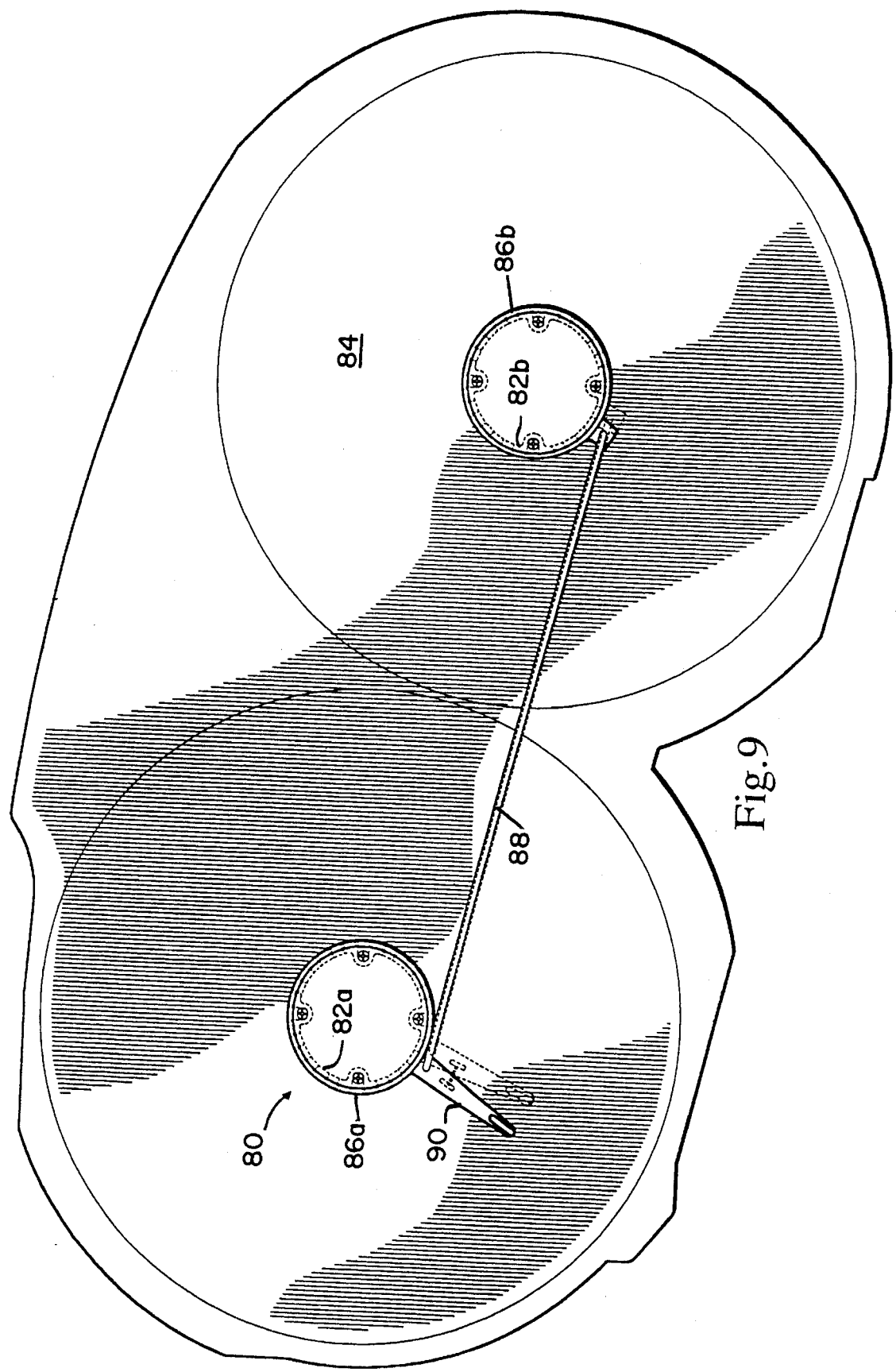
FIG. 9 is a top perspective view of an embodiment of the present invention configured for use on a dual blade riding mower deck.
Figure 10:
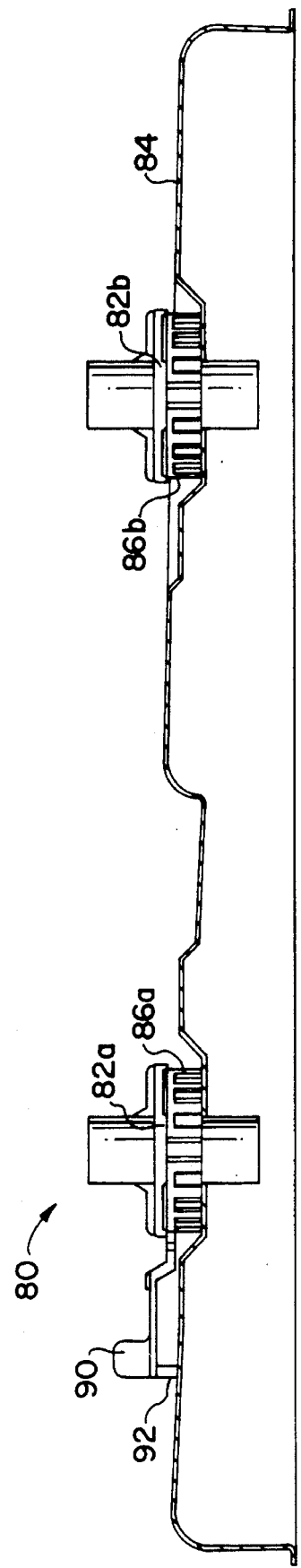
FIG. 10 is a side view, partially in section, of the embodiment shown in FIG. 9.

FIGS. 9 and 10 illustrate an embodiment of the present invention configured for use on a riding mower, in particular, a riding mower having two cutting blades. In this embodiment, adjustable vent apparatus 80 comprises a pair of stationary slotted rings 82a and 82b fixedly secured to cutting deck 84. Rings 82a and 82b may be formed as integral components of otherwise conventional yoke assemblies used to mount the cutting blades in riding mowers. A pair of selectively movable outer rings 86a and 86b are annularly disposed about rings 82a and 82b, and are interconnected by link 88. Outer ring 86a includes a handle 90 extending radially therefrom, which may be easily grasped by the user and moved as desired to select the position of rings 86a and 86b to achieve the desired airflow therethrough. Except as described herein, the operation of vent apparatus 80 is generally the same as that described above relative to vent 16. Therefore, the details of operation of apparatus 80 are omitted for the sake of brevity.

As shown in FIG. 10, handle 90 preferably includes a tab 92 extending downwardly therefrom and engaging the top surface of deck 84. Tab 92 is therefor operative to prevent inadvertent movement of outer rings 86a and 86b, thereby maintaining the selected airflow through vent apparatus 80. It may be preferable to include a series of notches formed in deck 84 at the point of engagement with tab 92, with appropriate indicia for each such notch identifying the corresponding position of rings 86a and 86b.

Link 88 operates to insure that rotational movement of ring 86a effects corresponding movement of ring 86b, so that rings 86a and 86b are set at substantially the same position relative to stationary rings 82a and 82b, respectively, so that the airflow is substantially the same in both cutting chambers of deck 84. It will be appreciated by those skilled in the art that the embodiment shown in FIGS. 9 and 10 may be modified as necessary to accommodate single or triple blade cutting decks, and that other changes, such as relocating or reconfiguring handle 90 to accommodate various body styles, may be made.

While the principles of an adjustable air vent for use on lawn mowers have been made clear from the above description and appended drawings, it is to be understood that the spirit and scope of this invention are to be limited solely by the following claims.

What is claimed is:

1. Adjustable ventilation apparatus for a lawn mower having a cutting deck supported by a plurality of wheels at a cutting height, said apparatus providing variable airflow into the interior of said cutting deck, said apparatus comprising:

a stationary member mounted to said cutting deck, said stationary member having a plurality of first openings formed therethrough, said first openings defining airflow passageways into the interior of said cutting deck; and a cover member slidably disposed adjacent said stationary member and having a plurality of second openings formed therethrough, said cover member being selectively moveable so that said second openings therein are moveable into and out of alignment with said first openings in said cover member, thereby defining fully open and closed positions, respectively, for said apparatus, wherein said open position allows maximum airflow through said apparatus into the interior of said cutting deck, and said closed position allows minimum airflow through said apparatus, said airflow being operative to affect the cutting performance of said lawn mower, and said cutting height is unaffected by said airflow.

2. Ventilation apparatus as set forth in claim 1, wherein:

said stationary member comprises an annular ring having inner and outer surfaces, with said first openings being laterally formed therethrough; and said cover member comprises an annular wall disposed concentrically about said outer surface of said stationary member.

3. Ventilation apparatus as set forth in claim 2, wherein:

said wall is taller than said stationary member.

4. Ventilation apparatus as set forth in claim 1, further comprising:

means for limiting the degree of movement of said cover member relative to said stationary member.

5. Ventilation apparatus as set forth in claim 1, wherein:

said cover member is selectively positionable in a plurality of intermediate positions between said fully open and closed positions, said intermediate positions providing a variety of airflow rates through said apparatus.

6. A lawn mower having variable airflow through the cutting deck, comprising:

a cutting deck, having an interior with at least one cutting blade operatively mounted therein, said cutting deck being mechanically supported at a cutting height;

an engine, operatively connected to said at least one cutting blade; and vent means disposed on said cutting deck allowing airflow into said interior, selectively adjustable between a plurality of settings, each said setting allowing a different degree of airflow, said airflow being operative to affect the cutting performance of said mower, wherein said cutting height is unaffected by said airflow.

7. A lawn mower as set forth in claim 6, wherein:

said cutting deck includes a pair of said cutting blades operatively mounted therein, each said cutting blade being secured beneath an opening in an upper portion of said cutting deck; and said vent means comprises a pair of adjustable vent members operatively secured to said upper portion of said cutting deck adjacent said openings, said vent members being interconnected by a suitable linkage whereby adjustment of one said vent member automatically effects corresponding adjustment of the other said vent member.

8. A lawn mower as set forth in claim 6, wherein:

said vent means are disposed intermediate said cutting deck and said engine.

9. A lawn mower as set forth in claim 6, wherein said vent means comprise:

a spacer member mounted to said lawn mower intermediate said engine and said cutting deck, said spacer member having a plurality of first openings formed therethrough, said first openings providing airflow passageways into the interior of said cutting deck; and a cover member slidably disposed adjacent said spacer member and having a plurality of second openings formed therethrough, said cover member being selectively moveable so that said second openings therein are moveable into and out of alignment with said first openings in said cover member, thereby defining open and closed positions, respectively, wherein said open position of said cover member allows maximum airflow through said vent means into the interior of said cutting deck, and said closed position allows minimum airflow through said vent means.

10. A lawn mower as set forth in claim 9, wherein:

said spacer member comprises an annular ring having inner and outer surfaces, with said first openings being laterally formed therethrough; and said cover member comprises an annular wall disposed concentrically about said outer surface of said spacer member.

11. A lawn mower as set forth in claim 10, wherein:

said cover member is selectively positionable at a plurality of positions intermediate said open and closed positions, so that the airflow into said cutting deck through said apparatus is further adjustable.

12. A lawn mower having variable airflow through the cutting deck, comprising:

a cutting deck, having an interior with at least one cutting blade operatively mounted therein;

an engine, operatively connected to said at least one cutting blade; and vent means disposed on said cutting deck allowing airflow into said interior, selectively adjustable between a plurality of settings, each said setting allowing a different degree of airflow, said vent means comprising:
a stationary outer cover member mounted intermediate said engine and said cutting deck, having a lower surface with a plurality of first radial slots formed therein, said first slots defining airflow passageways into the interior of said cutting deck;
a rotatable inner member disposed within said cover member, having a lower surface disposed adjacent said lower surface of said cover member with a plurality of second radial slots formed therein, said inner member being selectively rotatable relative to said cover member so that said second slots are moveable into and out of alignment with said first slots, thereby defining fully open and closed positions, respectively, wherein
said fully open position of said inner member allows maximum airflow through said apparatus into the interior of said cutting deck, and said closed position allows minimum airflow through said apparatus.

13. A lawn mower as set forth in claim 12, wherein:

said cover member comprises an annular vertical wall portion contiguous with said lower surface thereof, said lower surface being substantially planar, said wall portion having a plurality of first lateral openings formed therein; and said inner member comprises an annular vertical wall portion contiguous with said lower surface thereof, said wall portion having a plurality of second lateral openings formed therein, said first and second lateral openings being substantially completely in alignment when said inner member is in said fully open position and out of alignment when said inner member is in said closed position, wherein the relative position of said first and second lateral openings corresponds to the relative position of said radial slots, thereby providing an external visual indication of the condition of said vent means.

14. A lawn mower as set forth in claim 12, wherein:

said inner member is selectively positionable in a plurality of intermediate positions between said fully open and closed positions, said intermediate providing a variety of airflow rates through said vent means.

15. A lawn mower as set forth in claim 14, further comprising:

retaining means, associated with said vent means, for securing said inner member in each of said plurality of intermediate positions and said fully open and closed positions, thereby preventing inadvertent movement of said inner member.

16. Adjustable ventilation apparatus for a lawn mower having an engine mounted to a cutting deck, said apparatus providing variable airflow rate into the interior of said cutting deck, said apparatus comprising:

a stationary outer cover member mounted intermediate said engine and said cutting deck, having a lower surface with plurality of first radial slots formed therein, said first slots defining airflow passageways into the interior of said cutting deck;

a rotatable inner member disposed within said cover member, having a lower surface disposed adjacent said lower surface of said cover member with a plurality of second radial slots formed therein, said inner member being selectively rotatable relative to said cover member so that said second slots are moveable into and out of alignment with said first slots, thereby defining fully open and closed positions, respectively, wherein said fully open position of said inner member allows maximum airflow through said apparatus into the interior of said cutting deck, and said closed position allows minimum airflow through said apparatus.

17. Ventilation apparatus as set forth in claim 16, wherein:

said cover member comprises an annular vertical wall portion contiguous with said lower surface thereof, said lower surface being substantially planar, said wall portion having a plurality of first lateral openings formed therein; and said inner member comprises an annular vertical wall portion contiguous with said lower surface thereof, said wall portion having a plurality of second lateral openings formed therein, said first and second lateral openings being substantially completely in alignment when said inner member is in said fully open position and out of alignment when said inner member is in said closed position, wherein the relative position of said first and second lateral openings corresponds to the relative position of said radial slots, thereby providing an external visual indication of the condition of said apparatus.

18. Ventilation apparatus as set forth in claim 16, wherein:

said inner member is selectively positionable in a plurality of intermediate positions between said fully open and closed positions, said intermediate positions providing a variety of airflow rates through said apparatus.

19. Ventilation apparatus as set forth in claim 18, further comprising:

means for retaining said inner member in each of said plurality of intermediate positions and said fully open and closed positions, thereby preventing inadvertent movement of said inner member.

* * * * *